April 30, 1935.  H. A. WADMAN  1,999,744

ELECTRIC GLASS SUPPLY APPARATUS AND METHOD OF CONTROLLING THE SAME

Filed Jan. 14, 1933  2 Sheets-Sheet 1

Witness:
W. B. Thayer

Inventor:
Harold A. Wadman
by Brown & Parham
Attorneys

April 30, 1935.   H. A. WADMAN   1,999,744
ELECTRIC GLASS SUPPLY APPARATUS AND METHOD OF CONTROLLING THE SAME
Filed Jan. 14, 1933   2 Sheets-Sheet 2

Witness:
A. A. Horn

Inventor:
Harold A. Wadman
by Brown & Parham
Attorneys.

Patented Apr. 30, 1935

1,999,744

UNITED STATES PATENT OFFICE 1,999,744

ELECTRIC GLASS SUPPLY APPARATUS AND METHOD OF CONTROLLING THE SAME

Harold A. Wadman, West Hartford, Conn., assignor to Hartford-Empire Company, Hartford, Conn., a corporation of Delaware Application January 14, 1933, Serial No. 651,667

14 Claims. (Cl. 49—55)

This invention relates to apparatus for supplying portions or charges of molten glass from a supply body through which an electric current passes, and to methods involving the use of such apparatus.

Separated portions or charges of molten glass ordinarily are obtained from a supply body in a container by one of two general methods. According to the first of such methods, glass of the supply body is fed therefrom through an outlet of the container and charges or successive portions of the discharged glass are severed from the glass of the supply body at a plane adjacent to the outlet. According to the second of such methods, portions or quotas of molten glass are gathered from the surface of the supply body by suitable gathering instrumentalities, usually open-bottomed suction molds which are brought in turn into contact with the glass of the supply body at a given place at the surface of the latter and are filled with glass at such place because of the difference between the pressure in the molds and that on the surface of the glass of the supply body. Each mold, when filled, is lifted from the supply body and the connecting glass between the supply body and the glass in the mold is severed, as by a pair of cooperative shear blades, or by a blade that is moved across the bottom of the gathering mold.

It is now well known that glass of a supply body may be heated by passing an electric current therethrough, the glass acting as a resistor. It also has been proposed to supply electric currents to molten glass of a supply body for other useful purposes. So far as the present invention is concerned, it is sufficient to state that it is or may be desirable to pass electric current through glass of a supply body from any available and suitable source of electric current supply, which usually is a source of alternating current.

When electric current is supplied to glass of a supply body by any prior arrangement of electrical connections and according to any method proposed prior to the present invention and known to the applicant, the removal of portions of glass from the supply body, either by a feeding method or by a glass gathering method, is attended by undesirable results, substantially as hereinafter pointed out. Since the glass is a poor conductor of electric current, such current will pass readily therefrom to any metallic instrumentality that is brought into contact therewith, or even into sparking distance thereof. This may cause damage to or impairment of the metallic instrumentality to which current passes from the glass. For example, the repeated making and breaking of a circuit as shear blades are closed to cut through glass that is connected with the supply body and are opened to move out of contact with such glass has been attended by "arcing" and local heating of such blades. As a result thereof, the shear blades quickly become dull and unfit for use. Also, the current passing from the supply body to the shears or other glass contacting instrumentality may charge the metallic supporting structure therefor or associated machinery to an extent sufficient to cause annoyance or even danger to the life of any person coming into contact therewith.

The present invention seeks to obviate or overcome the undesirable results above referred to.

An object of the invention is to prevent or reduce to a minimum flow of electricity from an electric current conducting supply body of glass to any metallic or electrically conductive instrumentality, such as glass cutting shears or a gathering mold, which may be brought into contact with or within sparking distance of glass of the supply body or of glass connected therewith.

A further object of the invention is to prevent such leakage or "short circuiting" of electric current from a supply body of electric current conducting glass as might cause damage to associated machinery or injury to any person who comes into contact therewith.

A more specific object of the invention is to prevent "arcing" to, and harmful local heating and impairment of, severing mechanism that is employed to sever the connecting glass between a supply body of electric current conducting glass and each of successive portions of glass which have been discharged from an outlet of the container for the supply body, gathered from the surface of the supply body or otherwise removed therefrom.

Other objects and advantages of the invention will be pointed out in or become apparent from the following specification, when the same is considered in conjunction with the accompanying drawings, in which.

Figure 1:
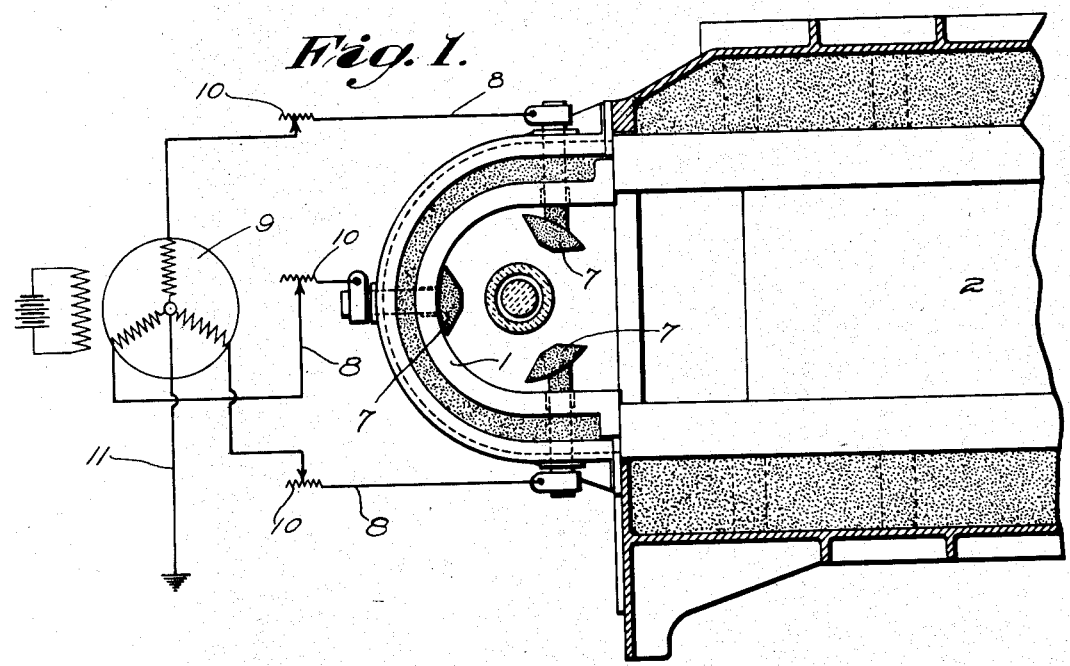
Figure 1 is a view showing the invention applied to a glass-feeding forehearth of a well known type of construction, but equipped with electrical mechanism embodying structural features of the invention and adapted to apply three-phase currents to the glass supply body in the forehearth, the view showing the forehearth structure in horizontal section.
Figure 2:
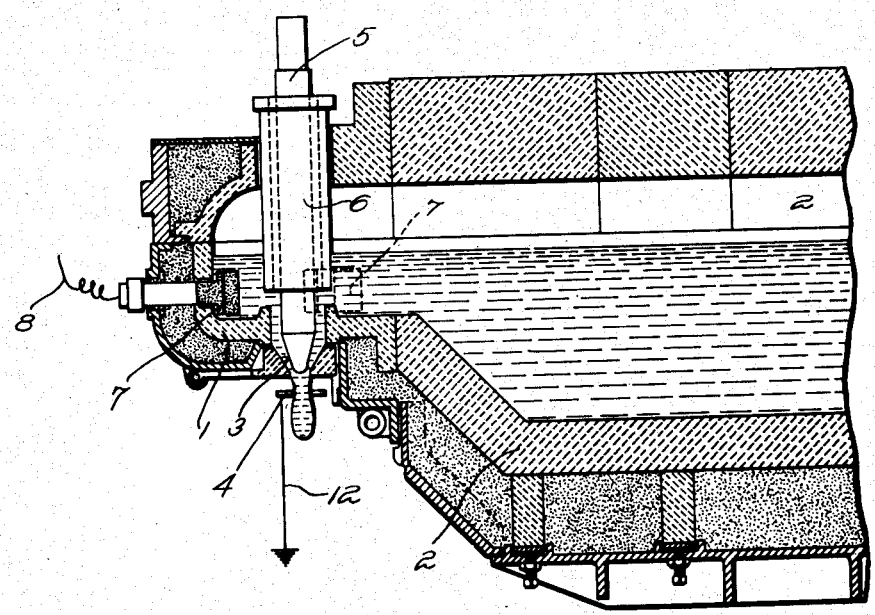
Fig. 2 is a longitudinal vertical section through the forehearth structure of Fig. 1, showing portions of the electrical mechanism with which the forehearth structure is equipped.

Referring now particularly to Figs. 1 and 2, the numeral 1 designates a glass-feeding bowl or spout at the outer end of a forehearth 2 into which glass may flow from a suitable source of supply, as from a melting furnace, not shown. The feed spout 1 has an outlet 3 in its bottom, submerged by the glass in the bowl. Glass from the source of supply will issue from the outlet 3 in successive suspended mold charge masses, from each of which a mold charge may be severed by suitable severing mechanism, such as that which is shown in part and more or less diagrammatically at 4 in Fig. 2. The discharge of glass from the outlet 3 may be under the control of a vertically reciprocable implement 5 and the flow of glass to the outlet passage may be regulated by a tubular member 6.

The structure that has been described so far and the other structural features illustrated in Figs. 1 and 2, with the exception of electrical mechanism to be hereinafter specifically pointed out, preferably are as included in the well-known Hartford-Empire Single Feeder, a disclosure of which is to be found in Patent No. 1,760,254, granted May 27, 1930 to Karl E. Peiler, assignor to the Hartford-Empire Company.

The means for supplying electric current to the glass in the feed bowl or spout comprises a plurality of electrodes 7 which, according to the present invention, are located equidistant from the axial or center line of the discharge orifice and also are spaced equal distances apart. These electrodes 7 have terminals extending through the walls of the feed spout or bowl and connected by electrical conductors 8 with the three phases of a three-phase generator 9. Variable resistances 10 are included in the conductors 8 so that the loads on the three phases of the system may be balanced. The neutral point of the three-phase generator 9 is connected by an electric conductor 11 with ground. The severing mechanism 4 also is connected by a conductor 12 with ground.

The operation of the embodiment of the invention just described is substantially as follows:

With the electrodes 7 spaced equal distances from each other and equi-distant from the axial line of the outlet 3, the glass passing through the outlet will be in the neutral zone of the three-phase system and will be at zero potential when the resistances of the portions of glass between the several electrodes are equal and the potential differences between the electrodes are the same. Therefore, so long as this balanced condition exists, no electric current will pass from the glass at or below the outlet to the shears by which the discharged glass is severed or to the supporting structure or associated machinery.

In the event that the resistances of the different portions of the glass between the respective electrodes do not remain normal or balanced but, because of differential temperature or other conditions in the glass, become unbalanced or abnormal, the glass at the outlet may have a potential slightly above zero. However, when the severing mechanism is connected to ground, as above described, and as indicated by the conductor 12, any flow of electric current thereto during the continuance of the abnormal conditions will be taken care of by the circuit which thus has been provided through ground to the neutral of the three-phase generator. The grounded neutral of the generator or source of power supply can always be provided in a three-phase system by using a Y connected secondary and grounding its neutral point.

In any event, flow of electric current from the glass to the shears during continuance of abnormal conditions such as above described will be relatively slight and insufficient to cause material injury to the shears or the building up of a sufficient charge of electricity in the frame-work of the feeding apparatus or associate machinery to cause injury to an operator or any person who may come in contact therewith.

Figure 3:
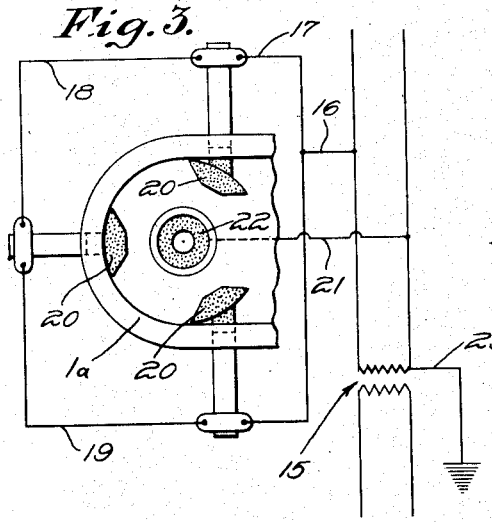
Fig. 3 is a more or less diagrammatic plan view of a glass feeding forehearth equipped with electrical mechanism adapted for use in carrying out the invention when single phase current is to be employed.
Figure 4:
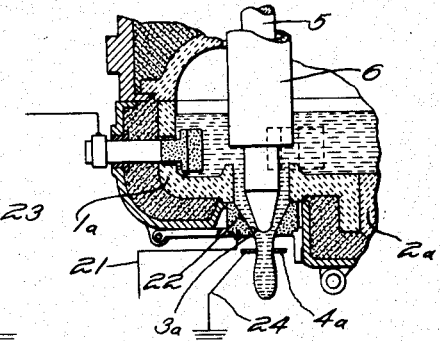
Fig. 4 is a longitudinal vertical section through the structure shown in Fig. 3.

In Figs. 3 and 4, the invention is illustrated as embodying an arrangement of parts for preventing flow of electric current from the glass being severed to the metallic shears when single phase electric current is supplied to the glass. In these views, the feed spout or bowl is designated 1ª, the forehearth proper 2ª, and the discharge outlet thereof is indicated at 3ª. The discharge of glass through the outlet 3ª may be under the control of implements 5 and 6, as in the construction of the preceding figures.

A source of single phase electric current, indicated by the transformer 15 in Fig. 3, has one side of its secondary connected electrically by the conductors 16, 17, 18 and 19, with the terminals of three electrodes 20 so that such electrodes are connected in parallel and receive electric current from the source of supply as though they were a single electrode. The other side of the secondary of the transformer 15 is connected electrically by a conductor 21 with an electrode 22, which is a ring-shaped member constituting the lower end portion of the outlet structure of the feed spout. The side of the secondary of the transformer 15 that is connected by the conductor 21 with the electrode 22 is connected by a conductor 23 with ground. The metallic shears or severing mechanism, indicated diagrammatically at 4ª in Fig. 4, is connected by a conductor 24 with ground.

The electrodes 20 are spaced equal distances apart and equidistant from the axial line of the electrode 22, which also is the axial line of the discharge outlet.

With the arrangement shown in Figs. 3 and 4 and just described, glass passing through the outlet $3^a$ will have a zero potential under normal conditions and, therefore, no electric current will pass from the glass being severed to the severing mechanism $4^a$. Should conditions become abnormal, as because of differential temperature conditions in different portions of the glass in the feed bowl or spout, the circuit that is provided through ground between the shears or severing mechanism and the grounded side of the secondary of the transformer will take care of the small amount of stray current without damage or injury to the severing mechanism or to the associated machinery.

Figure 5:
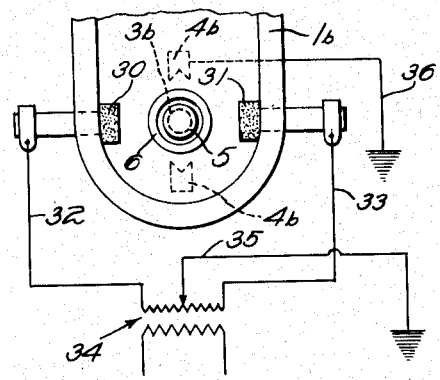
Fig. 5 is a view similar to Fig. 3, but showing a modified form of electrical mechanism for carrying out the invention when single phase current is to be employed.

In Fig. 5, the glass feed bowl or spout is designated $1^b$. The outlet thereof, $3^b$, is located in the bottom of the feed bowl or spout midway between the electrodes 30 and 31. Discharge of glass through such outlet may be under control of the implements 5 and 6, as in the preceding forms of construction. The blades of the severing mechanism are indicated at $4^b$.

The electrodes 30 and 31 are connected by the conductors 32 and 33, respectively, with the opposite sides of the secondary of a single phase transformer 34. A conductor 35 connects the middle point of the secondary of the transformer 34 with ground. A conductor 36 connects the severing mechanism with ground.

Flow of electric current from the glass to the shear blades when they are closed to cut through a column of discharged glass below the outlet is obviated by the arrangement shown because the circuit through ground between the severing mechanism and the secondary of the transformer 34 has the same potential at all points, the connection of the conductor 35 with the secondary being at a point that has been selected in view of the equi-distant location of the electrodes 30 and 31 from the discharge outlet, and, therefore, the potential of such glass at the outlet is the same as ground. The foregoing statement presupposes the existence of balanced or normal conditions in the system and is subject to modifications such as have been pointed out in the description of the preceding constructions when the conditions in the system become abnormal or unbalanced.

Figure 6:
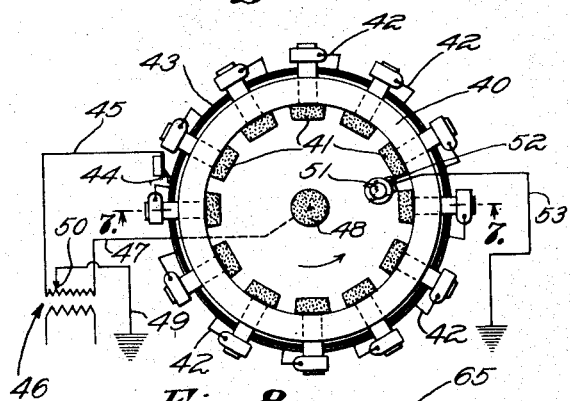
Fig. 6 is a plan view of a rotary gathering bowl or container for molten glass, equipped with apparatus employing structural features of the invention and adapted for use in an installation including a source of single phase current.
Figure 7:
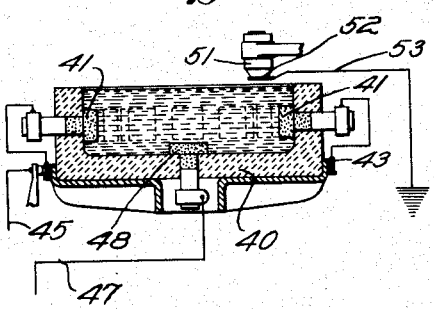
Fig. 7 is a vertical section through the structure shown in Fig. 6, substantially along the line 7—7 of Fig. 6.

In Figs. 6 and 7, a rotary bowl or container for a glass gathering pool of molten glass is indicated at 40. A plurality of electrodes 41 are spaced around the inner periphery of the container 40 and in contact with the glass therein. The electrodes 41 are connected at their terminal portions, as by the conductors 42, with a continuous conductor 43 that surrounds and rotates with the bowl. A brush 44 is in contact with the conductor 43 and is connected by a conductor 45 with one side of the secondary of a single phase transformer 46. The other side of the secondary of such transformer is connected by a conductor 47 with an electrode 48 that is in contact with the glass of the pool at the center of the bowl 40 and, therefore, equidistant from all the electrodes 41. A conductor 49 leading to ground has an adjustable connection at 50 with the secondary of the transformer 46.

The withdrawal of glass from the supply body in the rotary bowl 40 ordinarily is effected by dipping a mold, such as indicated at 51, Fig. 7, into contact with the glass in the bowl and in causing a suction in the mold to draw glass thereinto. This mold usually is one of a series which are brought in turn into contact with glass in the rotary bowl at a given place therein. Such molds usually are carried by a rotary table, or other carrier through which they are connected with ground. A severing mechanism, indicated at 52, is employed to sever the glass in the gathering mold from the glass in the pool. This severing mechanism is connected by conductor 53 with ground. The place of connection at 50, between the conductor leading to ground and the secondary of the transformer 46, is selected so that the circuit through ground between the severing mechanism and the secondary of the transformer will be at the same potential at all points when the severing mechanism 52 is brought in direct contact with the glass between the gathering mold and the supply body of glass in the rotary bowl. Consequently, under normal conditions, electric current will not flow from the glass in the pool to the severing mechanism.

Figure 8:
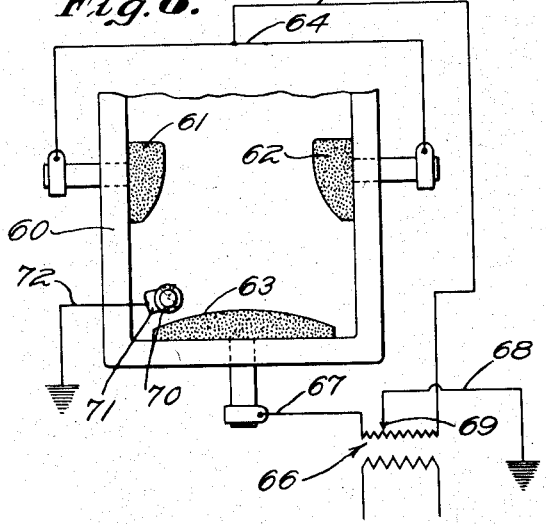
Fig. 8 is a plan view of a stationary container for a glass gathering pool, equipped with electrical mechanism of the invention for applying single phase electric current to the glass of the gathering pool.

In the embodiment of the invention shown in Fig. 8, a stationary container for a gathering pool or supply body of molten glass is indicated at 60. Electrodes in contact with the glass therein are designated 61, 62 and 63, respectively. The container shown is of generally rectangular shape and, in the arrangement shown, the electrode 63 is disposed at the outer end of the container, while the electrodes 61 and 62 are disposed at opposite sides of such container and equidistant from the electrode 63. The terminals of electrodes 61 and 62 are connected with each other by a conductor 64, which conductor is connected electrically by a conductor 65 with one side of a secondary of a single phase transformer 66. The other side of the secondary of such transformer is connected by a conductor 67 with the terminal of the electrode 63. A conductor 68, leading to ground, has an adjustable connection at 69 with the secondary of the transformer 66. A gathering mold for obtaining glass from the pool in the container 60 is indicated at 70 and the severing mechanism for severing the connecting glass between that in the receptacle 70 and the supply body in the container 60 is indicated at 71. Such severing mechanism is connected by a conductor 72 with ground.

The connection at 69 between the secondary of the transformer 66 and ground is at a place selected in view of the potential of the glass at the place at which the mold 70 will gather glass from the pool in the container 60. Thus, the grounded circuit leading from the severing mechanism in contact with the glass at the gathering station to the secondary of the transformer will have the same potential at all points and flow of electric current from the glass to the severing mechanism will be obviated, when conditions within the system are normal.

While features of construction of the hereinbefore particularly described embodiments of the invention and of other embodiments of the invention which may be provided vary, or may vary, the principle of the invention remains the same. The invention, therefore, is not to be limited, except as required by the terms of the appended claims.

I claim:

1. The method of preventing leakage of electric current from a supply body of electric current conducting molten glass to an electrically conductive element that is brought into contact with or within sparking distance of a portion of the glass of the supply body, which comprises flowing electric current through the glass between electrodes so located that said portion of the glass of the supply body is in a zone of substantial electric current density and so controlling flow of electricity in the glass of the supply body as to provide a substantially zero potential in the glass at the place proximate to said electrically conductive element.

2. The method of controlling electrical communication between a supply body of electric current conducting molten glass and an electrically conductive member that is brought into contact with or within sparking distance of a portion of the glass of the supply body, said body of molten glass being connected electrically with a source of electric current supply, which comprises flowing electric current through the glass between electrodes so located that said portion of the glass of the supply body is within a zone of substantial electric current density, causing said portion of the glass of the supply body to have substantially the same potential as a grounded connection of said source of electric current supply, and connecting said electrically conductive member with ground.

3. In the use of a supply body of molten glass having electrical connections with a source of electric current supply and from which glass is withdrawn at a definite place, the method of preventing leakage or "short-circuiting" of electricity from the glass being withdrawn to an electrically conductive element that is brought into contact therewith or within sparking distance thereof, said method comprising flowing electric current through the glass between electrodes so located that the place at which glass is withdrawn is in a zone of substantial electric current density, providing the same potential in the glass being withdrawn as that of a grounded connection of said source of electric current supply, and grounding said electrically conductive element.

4. In the use of a supply body of molten glass having electrical connections with a source of electric current supply and from which glass is withdrawn at a definite place, the method of preventing leakage or "short-circuiting" of electricity from the glass being withdrawn to an electrically conductive element that is brought into contact therewith or within sparking distance thereof, said method comprising flowing electric current through the glass between electrodes so located that the place at which glass is withdrawn is within a zone of substantial electric current density and providing an electrically conductive path of uniform potential from the glass being withdrawn through said electrically conductive element to said source of electric current supply.

5. In the use of a supply body of molten glass having electrical connections with a source of electric current supply and from which glass is withdrawn at a definite place, the method of preventing leakage or "short-circuiting" of electricity from the glass being withdrawn to an electrically conductive element that is brought into contact therewith or within sparking distance thereof, said method comprising passing electric current from said source of electric current supply through glass of the supply body between electrodes so located that the portion of glass at the supply body at the place at which the electrically conductive element is brought into contact with or within sparking distance of the glass is within a zone of substantial electric current density, providing an electrically conductive path through ground between said electrically conductive element and said source of electric current supply and adjusting the place of connection of said electrically conductive path with said source of electric current supply in accordance with the potential in the glass at the place of withdrawal of glass from the supply body so as to provide the same potential at all points along said ground path.

6. In the use of a supply body of molten glass, the method which comprises passing electric currents through the glass of the supply body between electrodes spaced around a definite place at which glass is withdrawn from the supply body, bringing an electrically conductive member periodically into contact with the glass withdrawn, connecting said electrically conductive member electrically with ground, and controlling the electric currents passing through the glass of the supply body so that the potential in the glass being withdrawn is the same as ground.

7. In the use of a supply body of molten glass having electrical connections with a source of electric current supply and from which successive portions of glass are withdrawn at intervals and are separated from the supply body by electrically conductive severing mechanism, the method of controlling electrical communication between the supply body of molten glass and said severing mechanism, which comprises passing electric current from said source of electric current supply through glass of the supply body between electrodes so located that the portion of glass of the supply body at the place at which the severing mechanism is brought into contact therewith is within a zone of substantial electric current density, connecting the severing mechanism with ground and connecting said source of electric current supply with ground so as to provide a path of uniform potential between the glass in contact with said severing mechanism and the source of electric current supply.

8. In the use of a supply body of molten glass having electrical connections with a source of electric current supply and from which portions of glass are withdrawn at intervals and are severed by metallic severing means, the method which comprises connecting the body of molten glass electrically with a source of electric current supply so that the portion of the supply body at the place at which portions of the glass are withdrawn will lie within a zone of substantial electric current density and will have a zero potential when electrical conducting conditions within said supply body are normal, and providing an electrically conductive path through ground between said severing means and said source of electric current supply for stray electric current passing from the glass to the severing mechanism when conditions within said supply body of molten glass become abnormal.

9. Molten glass supply apparatus comprising a container for molten glass having an outlet submerged by the glass therein, a three-phase generator, separate electrodes for the respective phases and connected electrically with the generator, said electrodes being in contact with the glass in the container and disposed equidistant from said outlet and spaced equal distances apart, whereby the glass in said outlet will have a zero potential when electrical conducting conditions in such glass are normal, and metallic severing means for severing charges from the glass discharged through said outlet.

10. Molten glass supply apparatus comprising a container for molten glass having an outlet submerged by the glass therein, a three-phase generator, separate electrodes within said container for the respective phases and connected electrically with the generator, said electrodes being in contact with the glass in the container and disposed equidistant from said outlet and spaced equal distances apart, whereby the glass in said outlet will have a zero potential when electrical conducting conditions in such glass are normal, metallic severing means for severing charges from the glass discharged through said outlet, an electrical connection between said three-phase generator and ground, and an electrical connection between said mechanical severing mechanism and ground.

11. Glass supply apparatus, comprising a container for molten glass having an outlet submerged by the glass therein, a plurality of electrodes in contact with the glass within the container and connected electrically with a source of electric current supply, said electrodes being so located that the glass at said outlet lies within a zone of substantial electric current density, metallic severing means for severing glass discharged from said outlet, an electrically conductive connection between severing means and ground, and an electrical connection between ground and said source of electric current supply, the place of juncture of said last named connection with the source of supply of electric current being selected in view of the relative positions of said outlet and said electrodes so that the potential of the glass at the outlet will be the same as the grounded electrically conductive path between said severing means and said source of electric current supply when said severing means is in contact with glass issuing from said outlet.

12. Glass supply apparatus comprising a container for molten glass, said container having an outlet opening in its base in position to be submerged by a supply body of glass in said container, an electrode of annular form located at the lower end of said outlet opening and concentric therewith, an electrical connection between one side of a source of electric current supply and said electrode, other electrodes in contact with the glass in the container and connected electrically with the other side of the source of electric current supply, an electrical connection between ground and the side of electric current supply with which said first-named electrode is connected, metallic severing mechanism for severing glass discharged from said outlet, and an electrical connection between said severing mechanism and ground.

13. Glass supply apparatus comprising a container for a supply body of molten glass, means adapted to gather a portion of glass from a supply body at the surface thereof, metallic severing mechanism for severing the glass thus withdrawn from the supply body at said place of withdrawal, electrodes in contact with glass of the supply body and connected electrically with a source of electric current supply, said electrodes being so located that the place of withdrawal of glass from said supply body is within a zone of substantial electric current density, an electrical connection between said severing mechanism and ground, and an electrical connection between said source of electric current supply and ground, said last-named electrical connection being selected in view of the relative positions of the electrodes and the place of withdrawal of glass from the supply body in the container so that the potential in the glass withdrawn at said place will be the same as the electrically conductive path through ground between the severing mechanism and the source of electric current supply when said severing mechanism is in contact with the glass being withdrawn.

14. Glass supply apparatus comprising a container for a supply body of molten glass, means for withdrawing portions of glass from the supply body, metallic severing means for severing the portions of glass withdrawn from the supply body, means for passing electric current through glass of said supply body, including electrodes so located that the place at which portions of glass are withdrawn from the supply body is within a zone of substantial electric current density and that the potential in the glass being withdrawn will be the same as ground when electric current conducting conditions in the glass of the supply body are normal, and an electrical connection between said severing means and ground.

HAROLD A. WADMAN.